(12) United States Patent
Detcheverry et al.

(10) Patent No.: US 10,225,240 B2
(45) Date of Patent: Mar. 5, 2019

(54) METHOD TO PROTECT A SET OF SENSITIVE DATA ASSOCIATED TO PUBLIC DATA IN A SECURED CONTAINER

(71) Applicant: GEMALTO SA, Meudon (FR)

(72) Inventors: Frank Detcheverry, Gemenos (FR); Thomas Gempp, Gemenos (FR); Fabien Courtiade, Gemenos (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 15/036,171

(22) PCT Filed: Oct. 31, 2014

(86) PCT No.: PCT/EP2014/073441
§ 371 (c)(1),
(2) Date: May 12, 2016

(87) PCT Pub. No.: WO2015/071114
PCT Pub. Date: May 21, 2015

(65) Prior Publication Data
US 2016/0294791 A1    Oct. 6, 2016

(30) Foreign Application Priority Data

Nov. 13, 2013 (EP) .................................. 13306545

(51) Int. Cl.
*H04L 29/06* (2006.01)
*G06F 21/62* (2013.01)

(52) U.S. Cl.
CPC ...... *H04L 63/0435* (2013.01); *G06F 21/6209* (2013.01); *H04L 63/061* (2013.01); *H04L 63/0428* (2013.01)

(58) Field of Classification Search
CPC ............ G06F 21/6209; H04L 63/0435; H04L 63/061; H04L 9/32; H04L 9/0428; H04L 9/0838

(Continued)

(56) References Cited

U.S. PATENT DOCUMENTS

| | | | |
|---|---|---|---|
| 2002/0112171 A1* | 8/2002 | Ginter | G06F 21/10 713/185 |
| 2003/0105721 A1* | 6/2003 | Ginter | G06F 21/10 705/54 |

(Continued)

FOREIGN PATENT DOCUMENTS

EP    1 049 287 A2    11/2000

OTHER PUBLICATIONS

International Search Report (PCT/ISA/210) dated Dec. 5, 2014, by the European Patent Office as the International Searching Authority for International Application No. PCT/EP2014/073441.

(Continued)

*Primary Examiner* — Ashokkumar B Patel
*Assistant Examiner* — William B Jones
(74) *Attorney, Agent, or Firm* — Buchanan Ingersoll & Rooney PC

(57) ABSTRACT

The present invention relates to a method to protect, in a secured container using an encryption key, a set of mixed sensitive and public data to be transferred to an entity. The method includes the steps of: generating a random key, ciphering the set of mixed sensitive and public data using said random key to obtain a ciphered set of data, generating an initialization value, and defining configuration information for the secured container. The initialization value, the configuration information and random key form a preamble. The preamble and the ciphered set of data are encrypted. The initialization value renders the resulting encrypted data (Continued)

variable from a secured container to another even in case of repetitive configuration information in the preamble.

7 Claims, 1 Drawing Sheet

(58) Field of Classification Search
USPC .......................................................... 713/171
See application file for complete search history.

(56) References Cited

U.S. PATENT DOCUMENTS

2005/0081031 A1* 4/2005 Peterson ............. G06F 21/6218
713/165
2005/0265546 A1 12/2005 Suzuki

OTHER PUBLICATIONS

Written Opinion (PCT/ISA/237) dated Dec. 5, 2014, by the European Patent Office as the International Searching Authority for International Application No. PCT/EP2014/073441.

* cited by examiner

METHOD TO PROTECT A SET OF SENSITIVE DATA ASSOCIATED TO PUBLIC DATA IN A SECURED CONTAINER

FIELD OF THE INVENTION

The present invention relates to a method to protect, in a secured container using an encryption key, a set of mixed sensitive and public data to be transferred to an entity. More particularly the invention concerns delivery of a large set of public and sensitive data that need to be provided into a single unalterable, randomized structure ciphered under an encryption key.

The invention also pertains to a secured container obtained by application of said method.

BACKGROUND OF THE INVENTION

Generally, public data (e.g., Global Platform (GP) identifier, transport application identifier) and sensitive data (e.g., Banking keys, Controlling Authority keys, TSM keys) need to be delivered into a secured container without compromising integrity.

This leads to a great amount of secured containers to be delivered all together. The known secured containers are encrypting the whole set of data comprising public and sensitive data under a same encryption key.

As a same encryption key, is used for the whole amount of secured containers, attacks can be done on the whole amount of secured containers to detect constant patterns by analyzing generated data blocks. This weakens the encryption key.

Further alternative and advantageous solutions would, accordingly, be desirable in the art in order to insure that encryption key integrity is not altered while using large amount of secured containers.

SUMMARY OF THE INVENTION

The present invention aims at avoiding the above-mentioned malicious attacks while providing a method robust and light enough so that it can be used by an embedded OS once the secured container is provided to the secure element, whatever this one is a card or an embedded secure element or any other secured entity.

The present invention is defined, in its broadest sense, as a method comprising the steps of:
  generating a random key,
  ciphering the set of data using said random key to obtain a ciphered set of data,
  generating an initialization value,
  defining configuration information for the secured container,
  said initialization value, said configuration information and random key forming a preamble, encrypting the preamble and the ciphered set of data, said initialization value rendering the resulting encrypted data variable from a secured container to another even in case of repetitive configuration information in the preamble.

The method of the invention allows delivering to external trusted third party a huge amount of secured containers providing optimum durability of the encryption key during transport, storage and loading. Thus, the schema of the invention allows secure exchange of data with third party not belonging to the provider of the sensitive data.

Indeed the encrypted data are such that no constant pattern can be found because of the application of the initialization value during the encryption of the data with the encryption key which is typically a replication key $K_{REP}$. This schema thus allows the protection and durability of the Encryption key. The non alterability of secured container, i.e. by patching, has been increased through this schema during transport/storage/loading steps. The term "initialization value" refers to its meaning in the field of cryptography where it is also called initialization vector or starting variable. It is well known, in this field, that initialization values are requested to be different and unpredictable for each block of data to be encrypted. They are typically required to be random or pseudorandom.

The invention provides a double encryption using random key and encryption key to avoid any plain text/ciphered couples to be localized in any secured container. It avoids jeopardizing assets to protect in the secured container. More precisely the invention avoids any identification or localization of the sensitive data and even less their jeopardizing.

Furthermore, the solution of the invention brings enough robustness and lightness to be read by an Operating System embedded in a token like secure element or card.

The invention avoids any patching or forging of data by the addressee. Configuration information and padding that are susceptible to be detected as fix encrypted pattern on a whole amount of secured containers are randomized thanks to the initialization values and chaining encryption method. In the invention, the random initialization value is of course a secret value only stored as first encryption blocks in the secured container. The structure of the secured container allows secure and easy extraction of a selected set of data by simply decrypting the secured container.

The application of the invention results in the absence of any "plain text/cipher text couple", e.g. data that can be localized and compared from a set of sensitive data to the other one before encryption key has been used to decrypt.

Therefore, the method according to the present invention allows reducing the risks of malicious attacks.

The present invention also concerns a device to produce secured containers by application of the method according to one of the preceding claims, said device comprising a random key generator, an initialization value generator and cryptographic module intended to perform the ciphering of the set of data using the random key to obtained a ciphered set of data and the encryption of a preamble and the ciphered set of data with an initialization value rendering the resulting encrypted data variable from a secured container to another even in case of repetitive configuration information in the preamble.

Such a device enables a data provider to obtain secured containers having public data in different localization among the encrypted sensitive data, thus avoiding any forging or patching of sensitive data through use of said encrypted public data patterns. It also renders attacks on the encryption key much more difficult. Its durability is thus much better than with the known methods to create secured containers. It is here noted that terms ciphering and encryption are employed to designate the same technical action. The use of the two terms is artificial and dedicated to the distinction between the two different steps of ciphering/encryption. The term "device" here refers to hardware or software products to implement the invention. Typically, it can refer to a solution provided to any entity having key management system.

The present invention also relates to a secured container as obtained by application of the method of the invention and comprising:

a preamble including at least an initialization value, configuration information and a random key;

a set of mixed sensitive and public data encrypted with the random key;

the preamble and the encrypted set of mixed sensitive and public data being further encrypted using an encryption key.

With the invention, if public data are moved or duplicated, they will however not be localizable in the secured container. That was not the case with application of the prior art methods of protecting a set of sensitive data associated to public data. The secured container of the invention is generic and can be adapted to any secure provisioning scheme (i.e. manufacturer loader, TSM server provisioning . . . ).

The solution of the invention can be deployed into any secure data transfer independent from the addressed elements (cards, secure elements . . . ) business requiring large amount of data and encryption key durability.

The obtained secured container can be used to securely recover data on demand through dedicated parsing according to security rules. Security rules can be defined in the configuration information CI.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

Figure 1:
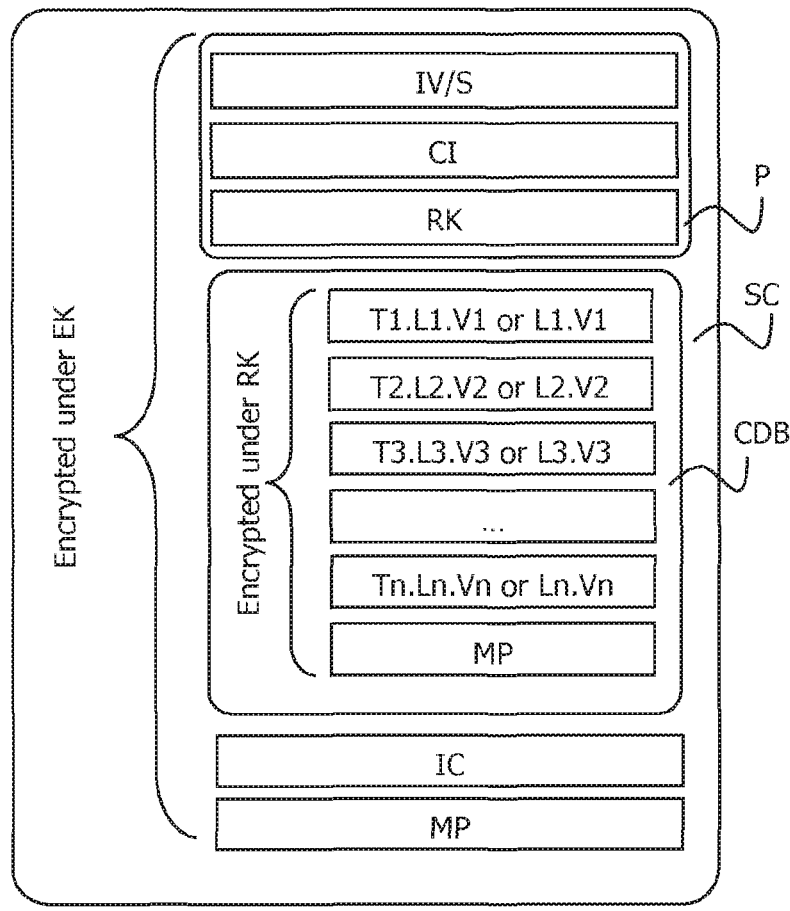
FIG. 1 represents a secured container obtained with a method of the invention.

For clarity, only those elements and steps which are useful to the understanding of the present invention have been shown in the drawings and will be described.

FIG. 1 schematically shows a secured container SC according to the invention. It includes a set of sensitive data formatted as Ti.Li.Vi or Li.Vi ended by a mandatory padding MP. This set of sensitive data is here a triplet built by a secure data generation environment, involving a Key Management System (KMS). These data form a data block CDB ciphered using a random key RK. The random key RK is typically preliminary generated by the KMS.

The secured container SC further includes a preamble P. This preamble comprises configuration information CI (e.g. a version of the secured container and optional security rules . . . ) and the random key RK used to cipher the set of sensitive data. This preamble P comprises at the beginning of the preamble an initialization value IV, typically a salt code S.

At the end of the data embedded in the secured container SC, are placed mandatory padding MP and an integrity check value IC. This IC is calculated from the preamble P and either the ciphered set of data CDB or plain text set of data according to configuration information CI.

The preamble P, the ciphered data block CDB, the integrity check value IC and the mandatory padding MP are then encrypted using an encryption key EK. A secured container SC encrypted under encryption key EK is thus obtained. As the secured container of the invention includes an initialization value IV at the beginning of the whole data P, CDB, IC and MP to be encrypted, during the encryption, the encrypted data are chained in function of this initialization data IV.

As a consequence, as a different initialization value IV is used for each created secured container SC, there will not be any position in the chain of bits within the secured container susceptible to be constant from one secured container to the other. This will strengthen the encryption key EK as it will be more difficult to break it. Indeed the invention avoids any attack using repetition of patterns inside the encrypted value to break the encryption key.

Figure 2:
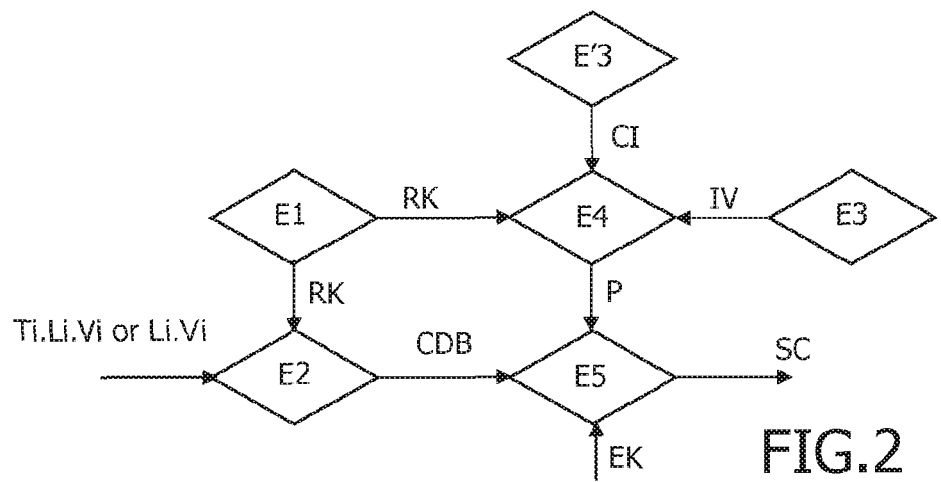
FIG. 2 shows a schematic flowchart of a method of the invention.

FIG. 2 schematically shows a method to protect a set of mixed sensitive and public data Ti.Li.Vi or Li.Vi associated to configuration information CI in a secured container SC while protecting also the encryption key EK used to form the secured container SC.

The configuration Information CI comprises typically a version of implementation describing used cryptographic algorithm, security rules, formatting options (ex. Ti.Li.Vi or Li.Vi), checksum calculation method (hash, CRC 16, CRC 32, CRC custom, . . . ) . . . .

This method comprises a first step E1 of generating a random key RK. Then a set of mixed sensitive and public data Ti.Li.Vi or Li.Vi is ciphered using the random key RK in a step E2. This leads to a ciphered data block CDB.

Then in a step E3, an initialization value IV is generated and, in a step E'3, configuration information are defined.

The initialization value IV, the random key RK and the configuration Information CI are then gathered to form a preamble P in a step E4.

This preamble P and the ciphered set of data CDB are then encrypted using the key EK in a step E5. The encryption, being applied on data having an initialization value IV at the beginning of the data to be encrypted, propagates a chaining dependant on the initialization value IV.

The obtained encrypted data will make the public data be encrypted with non predictable patterns. It renders any attacks by similarity very difficult. Thus the encryption key EK will be harder to break due to the fact that this form of attack cannot be used.

The invention applies to the personalization or post issuance management of many electronic products in telecom, identity, transport and banking fields. This applies whatever the form factor is: cards, secure elements, or others.

The invention merges public and sensitive data into an unalterable block delivered into a file comprehensive by embedded OS.

The invention aims particularly to be used as such without any preprocessing step before usage, typically by a secure element that would simply have to decrypt the secured container using the encryption key. No trans-ciphering is needed. The final aim is to obtain a maximal production rate in production centers or servers. Both production centers and servers do not even need any kind of KMS. They do not even need to know the encryption key.

In the above detailed description, reference is made to the accompanying drawings that show, by way of illustration, specific embodiments in which the invention may be practiced. These embodiments are described in sufficient detail to enable those skilled in the art to practice the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. Method to protect, in a secured container, a data block including a set of mixed sensitive and public data to be transferred to an entity, said method comprising the steps of:
   generating, by a hardware device, a random key;
   encrypting, by the hardware device, the data block including the set of mixed sensitive and public data using said generated random key to obtain an encrypted data block;
   generating, by the hardware device, an initialization value;
   defining configuration information for the secured container;
   creating a preamble including said initialization value, said configuration information, and the random key used to encrypt the data block, and
   encrypting, by the hardware device, using an encryption key, different from said random key, the encrypted data block, producing a double-encrypted data block, and the preamble, wherein
      said initialization value renders the encrypted preamble and the double-encrypted data block variable from one secured container to another secured container even in case of repetitive configuration information in the preamble.

2. Method to protect according to claim 1, wherein said method comprises a step of generating a salt code, said salt code being used to build the initialization value.

3. Method to protect according to claim 1, said method comprising a step of defining a version of implementation, said version of implementation being inserted in configuration information.

4. Method according to claim 3, wherein said version of implementation describes at least one of the followings: used cryptographic algorithm, security rules, formatting options, checksum calculation method, version ID.

5. Method to protect according to claim 1, said method comprising a step of calculation of an integrity check value over the preamble and the set of mixed sensitive and public data, either encrypted or plain text, said integrity check value being encrypted together with the preamble and the encrypted data block.

6. Device to produce a secured container, said device comprising;
   a random key generator configured to generate a random key;
   an initialization value generator configured to generate an initialization value; and
   a cryptographic module configured to perform
      a first encryption of a set of mixed sensitive and public data using the random key to obtain an encrypted data block, and
      a second encryption, using an encryption key different from said random key, of (i) the encrypted data block producing a double-encrypted data block, and (ii) a preamble including the initialization value, defined configuration information for the secured container, and the random key used to encrypt the data block, wherein said initialization value renders the encrypted preamble and the double-encrypted data block variable from one secured container to another secured container even in case of repetitive configuration information in the preamble.

7. Method to protect according to claim 1, wherein the step of generating an initialization value for the given secured container is a random generation.

* * * * *